Aug. 30, 1966    M. KRAKAUER ETAL    3,269,595
ARTICLE VENDING MACHINE
Filed Oct. 2, 1964    4 Sheets-Sheet 1
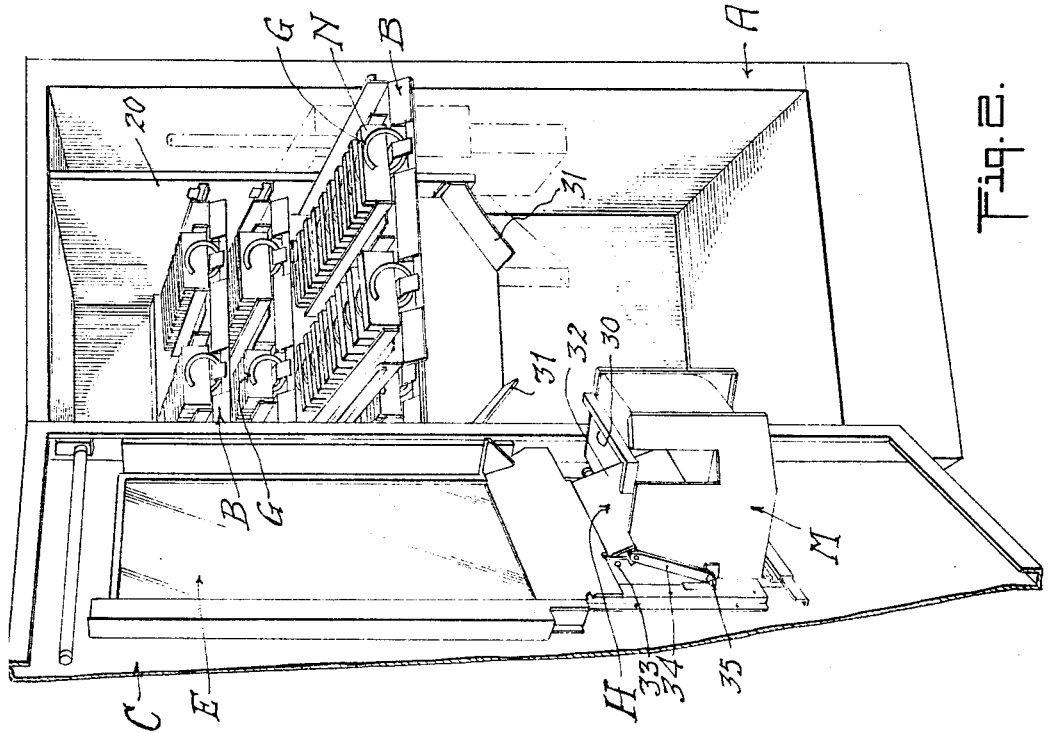
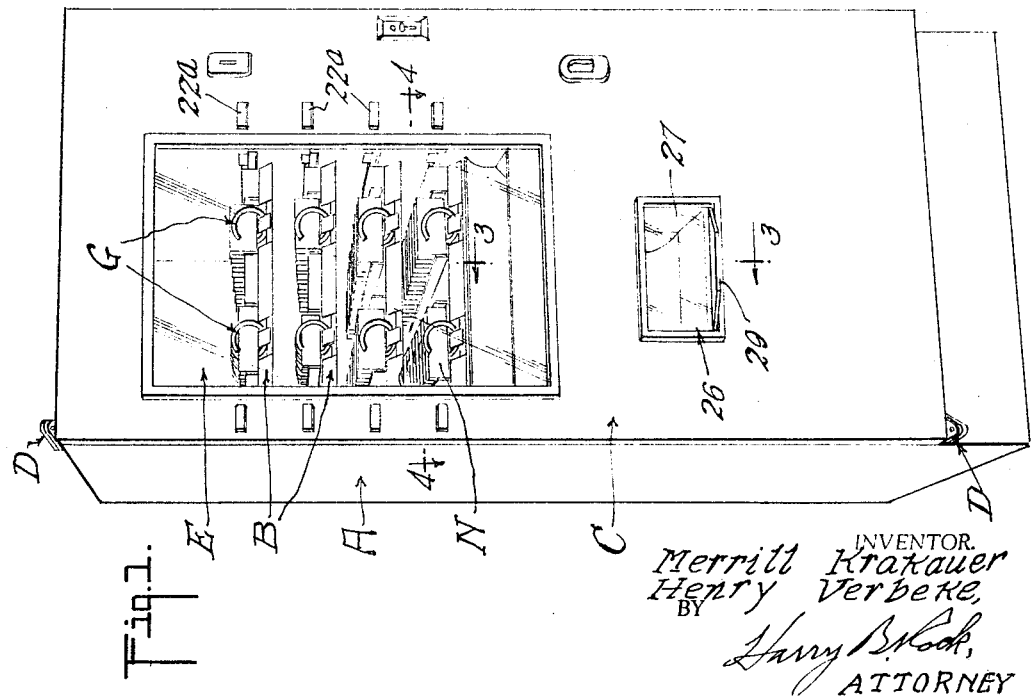
INVENTOR.
Merrill Krakauer
Henry Verbeke,
BY
Harry B. Cook,
ATTORNEY

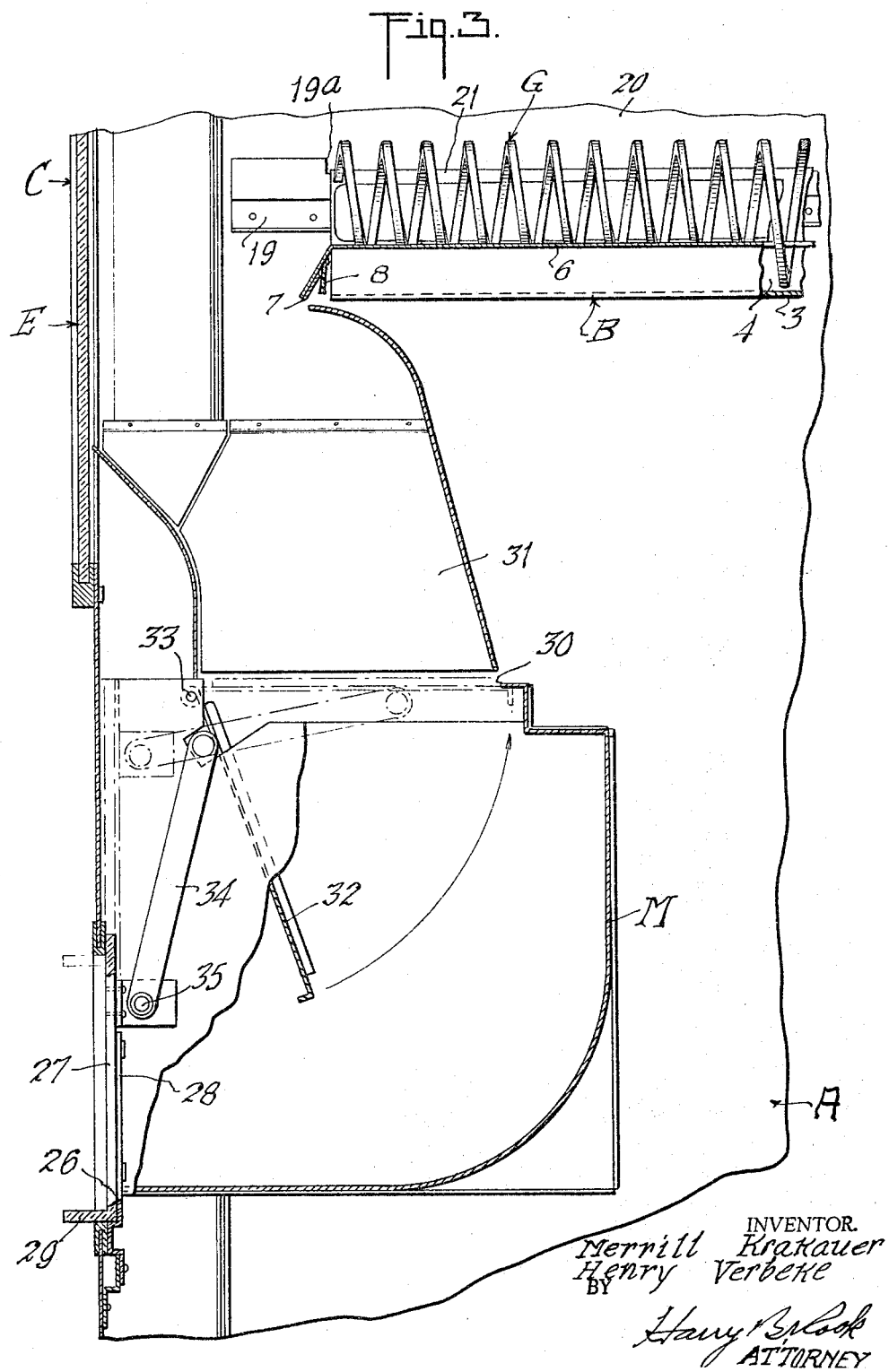

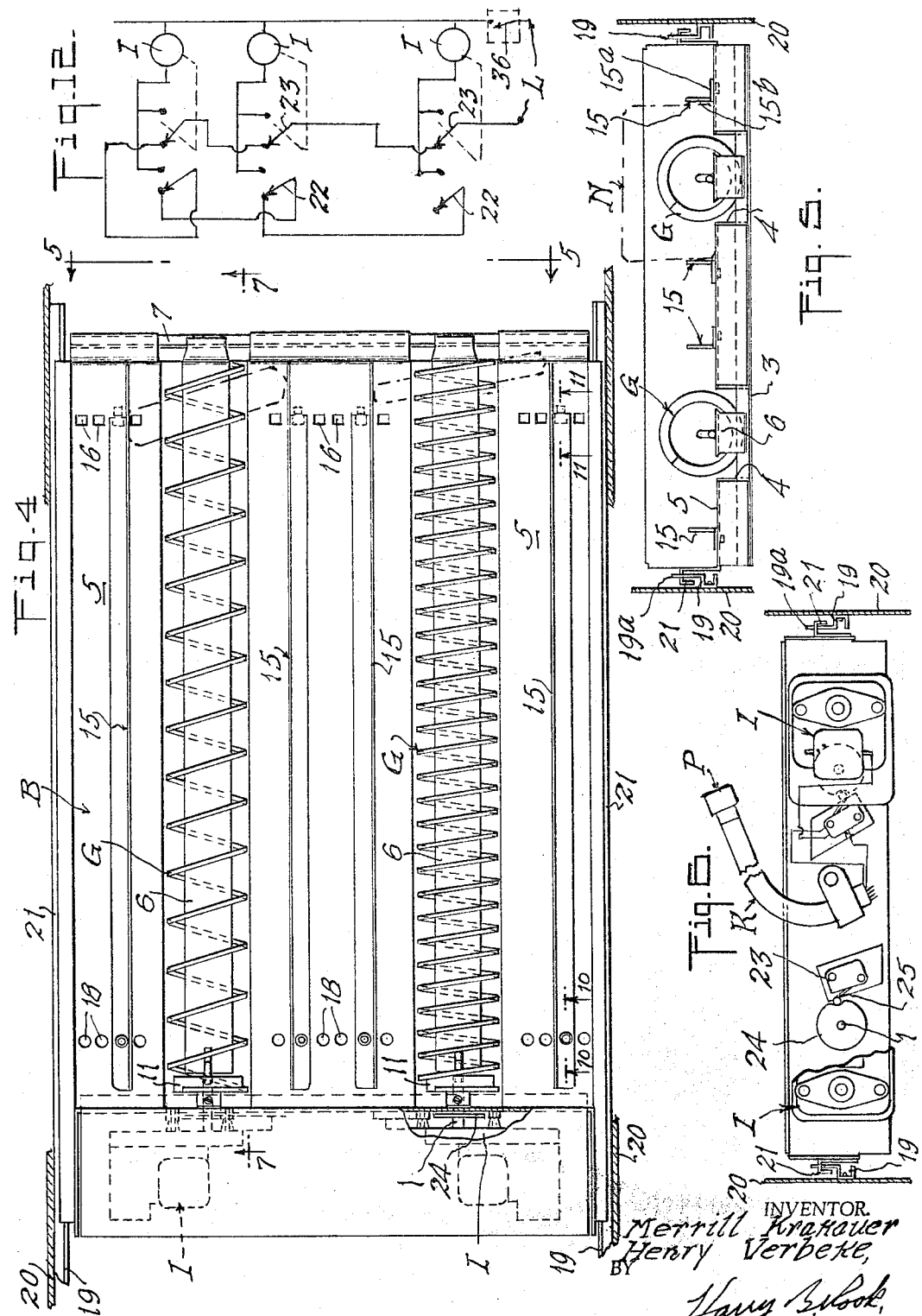

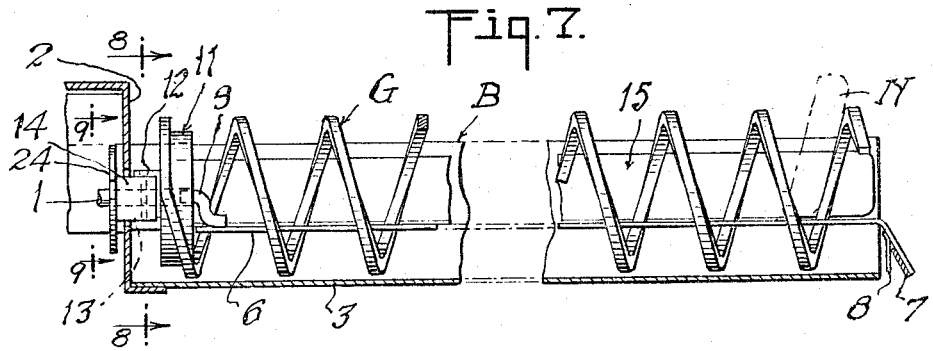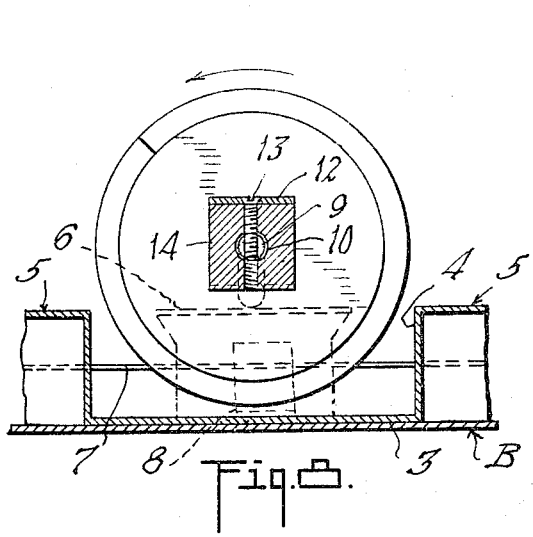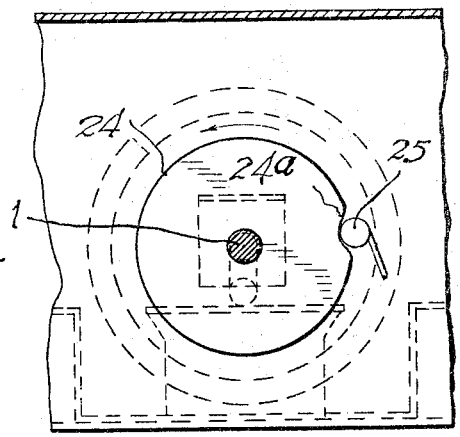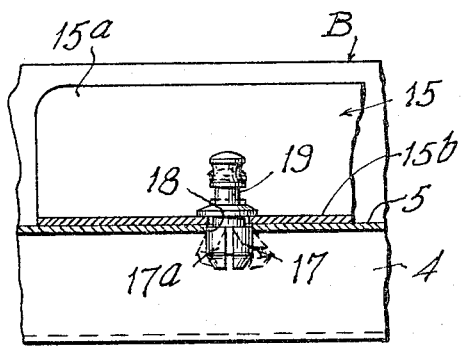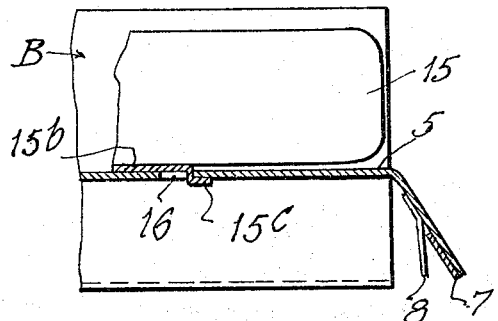

United States Patent Office 3,269,595
Patented August 30, 1966

3,269,595
ARTICLE VENDING MACHINE
Merrill Krakauer, 57 Falcon Road, Livingston, N.J., and
Henry E. Verbeke, Tanners Brook Road, Chester, N.J.
Filed Oct. 2, 1964, Ser. No. 400,983
13 Claims. (Cl. 221—75)

This invention relates in general to machines for vending bar-like or sheet-like articles, for example, candy bars, envelopes and cardboard wherein the articles are arranged in horizontal file formation on shelves in a casing or housing; the articles themselves are visible to the intended purchaser, and the different articles, for example, bars or packages of different candies, can be arranged in the same file.

One object of the invention is to provide a vending machine of this character which embodies novel and improved features of construction including horizontal shelves mounted in the casing and along each of which the articles are moved or fed and pushed from the discharge end of the shelf into a discharge chute by at least one helical feeder coil, and there is a motor for driving each feeder coil mounted on the corresponding shelf, each shelf thus constituting a unit that can be mounted in the casing and the motor or motors of which can be plugged into a circuit independently of the motors on the other shelves.

Another object is to provide a shelf embodying novel features of construction including rails for guiding the articles along the shelf and means for adjustably mounting the rails on the shelf to accommodate articles of different lengths.

A further object is to provide in such a machine novel means for slidably and removably mounting the shelves in the casing or housing that has a door opening so that the shelves can be partially slid out of the door opening for placing articles on the shelves or the shelves can be completely removed and replaced for any purpose such as for inspection or repair or for spacing the shelves different distances apart to accommodate articles of different sizes.

Still another object is to provide novel means for seperably connecting the feeder coil to the motor whereby feeder coils having convolutions of different pitch or spaced apart different distances may be interchanged, for example, to accommodate articles of different thickness.

In accordance with the one feature of the invention, the articles are pushed by the feeder coils off one edge of the shelf and dropped by an action of gravity through a chute to a delivery box that has a delivery opening normally closed by a closure plate; and another object of the invention is to provide novel and improved means to prevent unauthorized removal of articles from the shelves by insertion of a hand of a person or an implement through the delivery box and the chute.

Other objects of the invention are to provide a novel construction and combination of shelves, feeder coils and motors of the character described and an electric circuit for the motors including switches to ensure that an intended purchaser may cause operation of only the motor that drives the feeder for feeding the desired article and to prevent the feeding of more than one article at a time; and to provide other advantages and results that will be brought out by the following description when considered in conjunction with the following drawings in which FIGURE 1 is a front perspective view of a vending machine embodying the invention and showing the front door closed ready for vending or dispensing articles;

FIGURE 2 is a similar view showing the door open and one of the shelves partially pulled out of the casing;

FIGURE 3 is an enlarged fragmentary sectional view approximately on the plane of the line 3—3 of FIGURE 1;

FIGURE 4 is a horizontal sectional view approximately on the plane of the line 4—4 of FIGURE 1 with portions omitted;

FIGURE 5 is an elevational view of the discharge end of one of the shelves taken approximately from the plane of the line 5—5 of FIGURE 4, turned 90° on the sheet;

FIGURE 6 is a similar view of the other end of the shelf with portions broken away;

FIGURE 7 is a greatly enlarged fragmentary sectional view approximately on the plane of the line 7—7 of FIGURE 4;

FIGURE 8 is a further enlarged transverse vertical sectional view on the plane of the line 8—8 of FIGURE 7;

FIGURE 9 is a similar view on the plane of the line 9—9 of FIGURE 7;

FIGURE 10 is an enlarged fragmentary vertical sectional view on the plane of the line 10—10 of FIGURE 4;

FIGURE 11 is a similar view on the plane of the line 11—11 of FIGURE 4; and

FIGURE 12 is a schematic circuit diagram for the motors of one of the shelves.

Specifically describing the illustrated embodiment of the invention, the vending machine is shown as comprising a main casing or housing A that is approximately rectangular in both horizontal and vertical section and has mounted therein a plurality of article shelves B, in the present instance four shelves, in vertically spaced relation to each other. The front wall of the casing consists of a door C hinged at D to swing about a vertical axis on the casing at one side of the door opening as best shown in FIGURE 2. The door has a window E of a size and shape to expose all of the shelves, access to the shelves being prevented by a transparent plate F of glass or other suitable material through which the contents of the shelves can be viewed.

The articles to be vended are moved by helical feeder coils G along the shelves and caused to drop by gravity off the discharge ends of the shelves adjacent the door into a delivery or discharge chute H that in the present instance is carried by the door.

While the number of feeder coils per shelf may be varied to suit different conditions, in the present instance each shelf has two horizontally spaced apart helical feeder coils G, one end of each of which is approximately coincident with the corresponding or discharge end of the shelf as best shown in FIGURES 3 and 4 and the other end of which is connected to the output shaft 1 of a combined electric motor and speed reducer I that is rigidly mounted on the one end wall 2 of the shelf opposite the discharge end of the shelf as best shown in FIGURE 7.

Each shelf is shown as having a bottom wall 3 shaped to provide a channel 4 for each feeder coil, and at each side of each channel 4 the bottom wall of the shelf has an article supporting portion or ledge 5. Extending longitudinally therethrough each feeder coil is an auxiliary article support strip 6 in the same plane as the portion 5, one end of which is separably attached to the shelf. As shown, one end of the strip lies on a front flange 7 of the shelf and is held against longitudinal movement by a lug 8 secured to the strip and abutting the flange 7. The other end of the support strip 6 has secured thereon a finger 9 that is loosely fitted in an opening 10 in a coupling block 11 that is connected to motor output shaft 1 and to which one end of the feeder coil is rigidly connected. As shown, the opening 10 is coaxial with the output shaft 1 of the motor, and the coupling block 11 has an angle bracket 12 that is separably connected as by a screw 13 to a rectangular stud 14 carried by the output shaft 1 as best shown in FIGURES 4, 7, 8 and 9. The feeder coil with its coupling block 11 can be removed from the shelf by simply removing the screw 13, lifting the discharge end of the strip 6 from the flange 7 and pulling the strip 6 and the feeder coil longitudinally outwardly through the door opening. This construction permits easy and quick interchange of the feeder coils having different pitches, as shown for example in FIGURE 4 where the upper coil has a greater pitch than the lower coil so that thick and thin articles can be fed by the upper coil and the lower coil, respectively.

The shelves also have guide rails 15 for keeping the articles N on the shelves and between the convolutions of the feeder coils, in proper file formation, that is, for preventing endwise movement of the articles out of line with each other. The invention also provides for accommodation of articles of different lengths, and as shown the rails 15 are separably connected to the shelves and can be disposed in any one of a plurality of different positions parallel to and spaced from the corresponding feeder coil and from each other. As shown, each rail is in effect an angle bar having flange 15a and 15b, the former set flatwise on the corresponding portion 5 of the shelves and the other disposed vertically. One of the rails is disposed at each side of one of the feeder coils with the vertical flanges of the rails spaced apart a distance somewhat greater than the length of the articles so that the ends of the articles slidably abut the rails as best shown in FIGURE 2 and by dot and dash lines in FIGURE 5. The flange 15a of each rail is shown as having at one end thereof an angular tongue 15c that is removably insertable into any one of a plurality of holes 16 in the bottom wall of the shelf, and adjacent to its other end the flange 15a has secured therein the head element 17 of a known type of head and socket fastener that is insertable into and removable from any one of a plurality of holes 18 in the bottom wall of the shelf. The head element is shown as formed of resilient plastic material and with spring fingers 17a that normally are contracted so as to easily slip through the hole 18 but after the head has passed through the opening 18 are expandible by a reciprocating plunger 19 so as to prevent the head from being pulled out of the hole. The holes 16 and 18 are spaced apart in rows extending transversely of the shelf or perpendicularly to the feeder coil so that by placing the tongue of a rail in a selected one of the holes 16 and the head element 17 in the corresponding hole 18, the rail may be located a predetermined distance from the feeder coil and from the other rail at the other side of the feeder coil.

The shelves are also slidably and removably mounted in the casing so that they may be pulled partially out of the door opening of the casing as shown in FIGURE 2 for placing the articles on the shelves, or the shelves can be entirely removed from the casing for any desired purpose, for example, for access to the motors. As shown, there are two horizontal support rails 19 for each shelf, one secured to each of opposite side walls 20 of the casing; and each shelf has at each side thereof a hanger rail 21 that hangs and is slidable on one of the support rails 19. Preferably the outer ends of the support rails have upstanding lugs 19a to be abutted by the discharge ends of the shelves for preventing the shelves from becoming accidently displaced endwise from the rails. The support rails 19 may be spaced apart vertically different distances to provide for spacing of the shelves for accommodation of articles of different sizes, and the shelves are bodily removable from the support rails when desired or can be slid partially out of the casing through the door opening for the purpose of placing articles on the shelves to be vended.

In accordance with the invention, preferably the two motor speed reducer combinations I have a common supply cable K and a common plug P for connecting the two motors in series in an electric circuit so that each shelf and its feeder coils and motors can be handled as a unit; and the motors of all of the shelves are connected in circuit with control switches as schematically shown in FIGURE 12, preferably with a coin operated control switch Q common to all of the motors.

It has been common practice in machines of this general nature in the past to utilize a relay between an article selection switch and a motor to take away from the customer-operator the direct control of the motor and thereby prevent the possibility of the operator surreptitiously operating two motors at the same time so as to obtain the delivery of an article by each motor. This is a complicated construction and our invention eliminates the necessity for relays by utilizing a known type of positive brake motor which instantaneously stops so that the rotor shaft cannot rotate more than 180° after the electric power has been cut off from the motor by the switch. According to our invention, the article selection switch directly controls the motor and the operation of more than one motor at a time is prevented.

Referring to FIGURE 12 the main supply line is designated L, and for simplicity only two motors for one shelf are shown. The motors are connected in series circuit in such a way that only one can be operated at a time. The circuit includes a two-position or double contact selection button switch 22 for each motor to initially start the motors, and another similar two-position or double contact bypass switch 23 for each motor (shown also in FIGURE 5 of the drawings) controlled by a cam disc 24 on the output shaft 1 of the motor. The selection button switch has a finger piece 22a mounted in the door C of the casing in juxtaposition to the feeder coil of the corresponding motor. Normally the selection button switches 22 and the bypass switches 23 are in one position to prevent operation of all of the motors. When one of the selection button switches is manually moved to its other position as indicated by broken lines in FIGURE 12, the corresponding bypass switch 23 is disposed in one position with its actuator arm 25 spring-seated in a notch 24a in the cam disc 24 and closes the circuit through the motor to permit starting of the motor. When the motor starts the cam disc moves the switch 23 to the other position so as to continue the operation of the motor for one revolution whereupon the actuator arm 25 again enters the notch in the cam disc so that the switch is returned to its first position to stop the motor. Meanwhile the selection button switch had been automatically spring-returned to its first position ready for the next vending operation. During the one rotation of the output shaft 1, the feeder coil is rotated one complete revolution so as to move the article that is nearest the discharge end of the shelf off the shelf and into the discharge chute H. Preferably a normally open coin closed switch 36 is included in the circuit so that none of the motors can be operated until a proper coin has been inserted for closing the switch 36.

The discharge chute H includes a delivery box M mounted on the inside of the door C and having a delivery opening 26 in the door. This delivery opening is normally closed by a preferably transparent plate 27 that is vertically slidable in guides 28 on the door and has a handle flange 29 projecting from the front thereof. The upper end of the delivery box has an opening 30 through which the articles fall into the box, the articles being directed into the opening 30 by deflector plates 31 mounted in the casing beneath the shelf. The plate 27 is raised to the broken line position in FIGURE 3 to open the opening 26 and permit the article to be removed manually from the delivery box, and in accordance with the invention means to thwart attempts to pilfer articles is provided for preventing the insertion of a human hand or an implement through the delivery box upwardly to any of the shelves in such a way as to dislodge the articles from the shelves. As shown, a trap door 32 for the opening 30 is hingedly mounted at 33 on the inside of the door C and is pivotally connected to one end of a link 34 the other end of which is pivotally connected as indicated at 35 to a block on the closure plate 27. Normally the trap door is open as shown by solid lines in FIGURE 3, but when the closure plate 27 is raised for removal of the article from the box, the trap door is swung upwardly to close the opening 30 as shown by broken lines, thereby preventing the insertion of any implement or the hand of a person upwardly through the opening 30.

It will be understood by those skilled in the art that the invention has been illustrated and described as embodied in the specific structural details, but that the construction of the machine may be widely modified and changed within the spirit of the invention and the scope of the appended claims.

We claim:

1. An article vending machine comprising a casing, a shelf in said casing, a discharge chute below one end of the shelf, a helical feeder coil rotatably mounted on said shelf to receive articles between its convolutions with the articles slidably supported by said shelf and with one end of said coil approximately coincident with said one end of the shelf for moving the articles toward and off said end of the shelf, a window in said casing adjacent said one end of the shelf for viewing the article next to be dispensed, an electric drive mechanism mounted on the other end of said shelf and having a rotatable output shaft connected to the other end of said feeder coil, an electric circuit for controlling the drive mechanism, and means mounting said shelf in said casing for horizontal sliding movement with respect thereto, to enable the partial withdrawal of said shelf, together with said helical feeder coil and said drive mechanism, from said casing.

2. An article vending machine as defined in claim 1 wherein said casing has a normally closed door opening, said means mounting the shelf in the casing comprising horizontal support rails on opposite side walls of the casing and hanger rails on opposite sides of the shelf, said hanger rails slidably engaging said support rails to provide for selective lifting of the shelf from the support rails and complete removal of the shelf from the casing and sliding of the shelf along the support rails partially out of the casing through said door opening.

3. An article vending machine as defined in claim 1 wherein said electric drive mechanism comprises an electric positive brake motor that stops instantaneously after the electric power has been cut off from the motor.

4. An article vending machine as defined in claim 3 wherein said electric circuit includes a two-position selection switch and a two-position by-pass switch each normally in one position with the circuit through the motor open and providing for starting of the motor upon actuation of the selection switch into its other position, and means actuated by the motor for moving the by-pass switch to its other position to continue the operation of the motor for one revolution after the selection switch has been returned to its first-mentioned position and then for permitting return of the by-pass switch to its first-mentioned position to stop the motor.

5. An article vending machine comprising a casing having a normally closed door opening, a shelf movable horizontally into and out of the casing through said door opening, means for removably mounting the shelf in the casing, a delivery chute supported within said casing below one end of the shelf, a helical feeder coil rotatably mounted on said shelf to receive articles between its convolutions with the articles slidably supported by said shelf and with one end approximately coincident with said end of the shelf for moving the articles toward said end of the shelf, a window in said casing adjacent said one end of the shelf for viewing the article next to be dispensed, an electric positive brake motor mechanism mounted on the other end of said shelf and having a rotatable output shaft connected to the other end of said feeder coil, an electric circuit for connecting the motor mechanism to a source of electricity, said circuit including a two position selection switch and a two-position by- pass switch each normally in one position to disconnect the motor mechanism from said source, actuation of the selection switch into its other position connecting said motor mechanism to said source to initiate operation of said mechanism, and a cam actuated by the motor mechanism for moving the by-pass switch to its other position to continue the operation of the mechanism for one revolution of said output shaft after the selection switch has been returned to its first-mentioned position and then for permitting return of the by-pass switch to its first-mentioned position to stop the mechanism.

6. An article vending machine comprising, in combination, a casing including a front wall portion having a viewing window therein and a delivery opening beneath said viewing window, article receiving means supported by said casing adjacent said delivery opening, a horizontally disposed shelf positioned within said said casing at the level of said viewing window, a helical feeder coil rotatably carried by said shelf with the axis of said coil extending from front to back with respect to said casing, the articles to be vended being disposed between the convolutions of said helical feeder coil and being visible through said viewing window, a supply of electrical power, a drive mechanism mounted on said shelf and connected to said supply for rotating said helical feeder coil in a direction to advance successive articles carried thereby toward said front wall portion, the foremost article moving from said feeder coil to said article receiving means, and means mounting said shelf in said casing for horizontal sliding movement with respect thereto, to enable the partial withdrawal of said shelf and the feeder coil carried thereby from said casing.

7. An article vending machine comprising, in combination, a casing including a front wall portion having a viewing window therein and a delivery opening beneath said viewing window, article receiving means supported by said casing adjacent said delivery opening, first door means normally closing said delivery opening but manually movable to an open position to permit access to articles received by said article receiving means, a slidable shelf positioned within said casing at the level of said viewing window, the forward portion of said shelf being spaced from said front wall portion, a helical feeder coil rotatably carried by said shelf with the axis of said coil extending from front to back with respect to said casing, the articles to be vended being interposed between the convolutions of said coil with the foremost article being visible through said viewing window, second door means interposed between said article receiving means and said helical feeder coil, said second door means being normally open to permit the passage of articles from said feeder coil past said second door means to said article receiving means, linkage means interconnecting said first door means and said second door means, to close said second door means upon movement of said first door means to said open position, and a drive mechanism mounted on the rearward portion of said shelf for rotating said helical feeder coil in a direction to advance the visible article toward the space between the forward portion of said shelf and said front wall portion, said article dropping through said space past the open second door means to said article receiving means and being received thereby for withdrawal through said delivery opening upon the movement of said first door means to said open position, said second door means closing upon the opening of said first door means to prevent access to the articles carried by said helical feeder coil.

8. An article vending machine comprising, in combination, a casing including a front wall portion having a viewing window therein and a delivery opening beneath said viewing window, article receiving means supported by said casing adjacent said delivery opening, first door means normally closing said delivery opening but manually movable to an open position to permit access to articles received by said article receiving means, a shelf positioned within said casing at the level of said viewing window, the forward portion of said shelf being spaced from said front wall portion, a helical feeder coil rotatably carried by said shelf with the axis of said coil extending from front to back with respect to said casing, the articles to be vended being interposed between the convolutions of said coil with the foremost article being visible through said viewing window, second door means interposed between said article receiving means and said helical feeder coil, said second door means being normally open to permit the passage of articles from said feeder coil past said second door means to said article receiving means, linkage means interconnecting said first door means and said second door means, to close said second door means upon movement of said first door means to said open position, a drive mechanism supported by said shelf for rotating said helical feeder coil in a direction to advance the visible article toward the space between the forward portion of said shelf and said front wall portion, said article dropping through said space past the open second door means to said article receiving means and being received thereby for withdrawal through said delivery opening upon the movement of said first door means to said open position, said second door means closing upon the opening of said first door means to prevent access to the articles carried by said helical feeder coil, and means mounting said shelf in said casing for horizontal sliding movement with respect thereto, to enable the partial withdrawal of said shelf, together with said helical feeder coil and said drive mechanism, from said casing.

9. An article vending machine comprising, in combination, a casing including a front wall portion having a viewing window therein and a delivery opening beneath said viewing window, article receiving means supported by said casing adjacent said delivery opening, shelf means horizontally positioned within said casing at the level of said viewing window, a plurality of helical feeder coils rotatably carried by said shelf means with the axes of said coils extending from front to back with respect to said casing, the articles to be vended being disposed between the convolutions of said helical feeder coils with the foremost articles being visible through said viewing window, a plurality of drive mechanisms mounted on said shelf means and respectively connected to said helical feeder coils for rotating a selected coil in a direction to advance successive articles carried thereby toward said front wall portion, the foremost article on the selected coil moving therefrom to said article receiving means, an electric circuit for controlling said drive mechanisms including two-position series-connected selection switches and two-position series-connected bypass switches, one of said selection switches and one of said bypass switches being in operative circuit relationship with each of said drive mechanisms, each of said selection and bypass switches being normally maintained in one position for holding the circuit through the corresponding drive mechanisms open, the drive mechanism for the selected feeder coil being actuated upon the movement of the associated selection switch to its other position, means operated by the actuated drive mechanism for moving the associated bypass switch to its other position to continue the operation of said actuated drive mechanism for a length of time sufficient to rotate said selected feeder coil through a single complete revolution, said associated bypass switch returning to its said one position as the selected feeder coil completes its revolution to arrest the operation of the drive means therefor, and means mounting said shelf means in said casing for horizontal sliding movement with respect thereto, to enable the partial withdrawal of said shelf means and the feeder coils carried thereby from said casing.

10. An article vending machine comprising a casing, a shelf in said casing, a discharge chute below one end of the shelf, a helical feeder coil rotatably mounted on said shelf to receive articles between its convolutions with the articles slidably supported by said shelf and with one end of said coil approximately coincident with said one end of the shelf for moving the articles toward and off said end of the shelf, an electric drive mechanism supported by said shelf and having a rotatable output shaft connected to the other end of said feeder coil, an electric circuit for controlling the drive mechanism, means mounting said shelf in said casing for horizontal sliding movement with respect thereto, to enable the partial withdrawal of said shelf, together with said helical feeder coil and said drive mechanism, from said casing, a delivery box in the casing below said chute having a delivery opening, a vertically slidable door mounted in the casing for normally closing said delivery opening, a pilfer-preventing trap door hingedly mounted in the casing between said delivery opening and said chute, and a connection between said trap door and said vertically slidable door for normally holding the trap door in position to permit an article to drop from the chute past the trap door into the delivery box and for actuating the trap door into a position to prevent the insertion of a human hand or implement through the delivery opening upwardly through the chute.

11. An article vending machine comprising a casing, a shelf in said casing, a discharge chute below one end of the shelf, a helical feeder coil rotatably mounted on said shelf to receive articles between its convolutions with the articles slidably supported by said shelf and with one end of said coil approximately coincident with said one end of the shelf for moving the articles toward and off said one end of the shelf, an electric drive mechanism supported by said shelf and having a rotatable output shaft, block means affixed to the other end of said feeder coil, an angle bracket carried by said block means, said bracket being separably connected to the output shaft of the drive mechanism, an electric circuit for controlling the drive mechanism, and means mounting said shelf in said casing for horizontal sliding movement with respect thereto, to enable the partial withdrawal of said shelf, together with said helical feeder coil and said drive mechanism, from said casing.

12. An article vending machine comprising a casing, a shelf in said casing, a helical feeder coil rotatably supported by said shelf for receiving articles between its convolutions and for moving the articles off said shelf, an electric drive mechanism for rotating said feeder coil, an electric circuit for controlling the drive mechanism, article receiving means supported in the casing below said shelf having a delivery opening, a vertically slidable door mounted in the casing for normally closing said delivery opening, a pilfer-preventing trap door mounted in the casing between said delivery opening and said shelf, and a connection between said trap door and said vertically slidable door for normally holding the trap door in position to permit an article to drop from the feeder coil past the trap door into the article receiving means and for actuating the trap door into a position to prevent the insertion of a human hand or implement through the delivery opening upwardly toward the shelf.

13. An article vending machine comprising a casing, a shelf in said casing, a helical feeder coil rotatably supported by said shelf for receiving articles between its convolutions and for moving the articles off said shelf, an electric drive mechanism carried within said casing and having a rotatable output shaft, block means affixed to said feeder coil, an angle bracket carried by said block means, said bracket being separably connected to the output shaft of the drive mechanism, an electric circuit for controlling the drive mechanism, and means mounting said shelf in said casing for horizontal sliding movement with respect thereto, to enable the partial withdrawal of said shelf, together with said helical feeder coil, from said casing.

(References on following page)

References Cited by the Examiner

UNITED STATES PATENTS

| | | | |
|---|---|---|---|
| 339,561 | 4/1886 | Locke | 198—213 X |
| 1,986,714 | 1/1935 | Clayton | 194—10 |
| 2,240,928 | 5/1941 | Hamel | 221—248 |
| 2,493,223 | 1/1950 | Brock | 221—194 X |
| 2,575,300 | 11/1951 | Schrager | 312—35 |
| 2,590,736 | 3/1952 | Tandler et al. | 194—10 |
| 2,599,173 | 6/1952 | Hamilton | 221—129 X |
| 2,777,603 | 1/1957 | Baum | 221—129 X |
| 2,925,194 | 2/1960 | Mihalek | 221—130 X |
| 2,956,661 | 10/1960 | Radcliffe | 221—129 X |
| 2,975,935 | 3/1961 | Hebel | 194—10 X |
| 2,990,227 | 6/1961 | McCaleb | 312—35 |
| 3,057,511 | 10/1962 | Mannhardt | 221—75 |
| 3,085,711 | 4/1963 | Holstein et al. | 221—75 |
| 3,135,425 | 6/1964 | Korr | 221—282 |
| 3,146,907 | 9/1964 | Bookout | 221—67 |
| 3,174,646 | 3/1965 | Johnson | 221—129 |
| 3,178,055 | 4/1965 | Schuller | 221—129 X |

References Cited by the Applicant

UNITED STATES PATENTS

| | | |
|---|---|---|
| 481,280 | 8/1892 | Kibby. |
| 921,763 | 5/1909 | Weed. |
| 1,139,477 | 5/1915 | Boddy. |

ROBERT B. REEVES, *Primary Examiner.*

KENNETH L. LEIMER, LOUIS J. DEMBO, *Examiners.*